Figure 1:
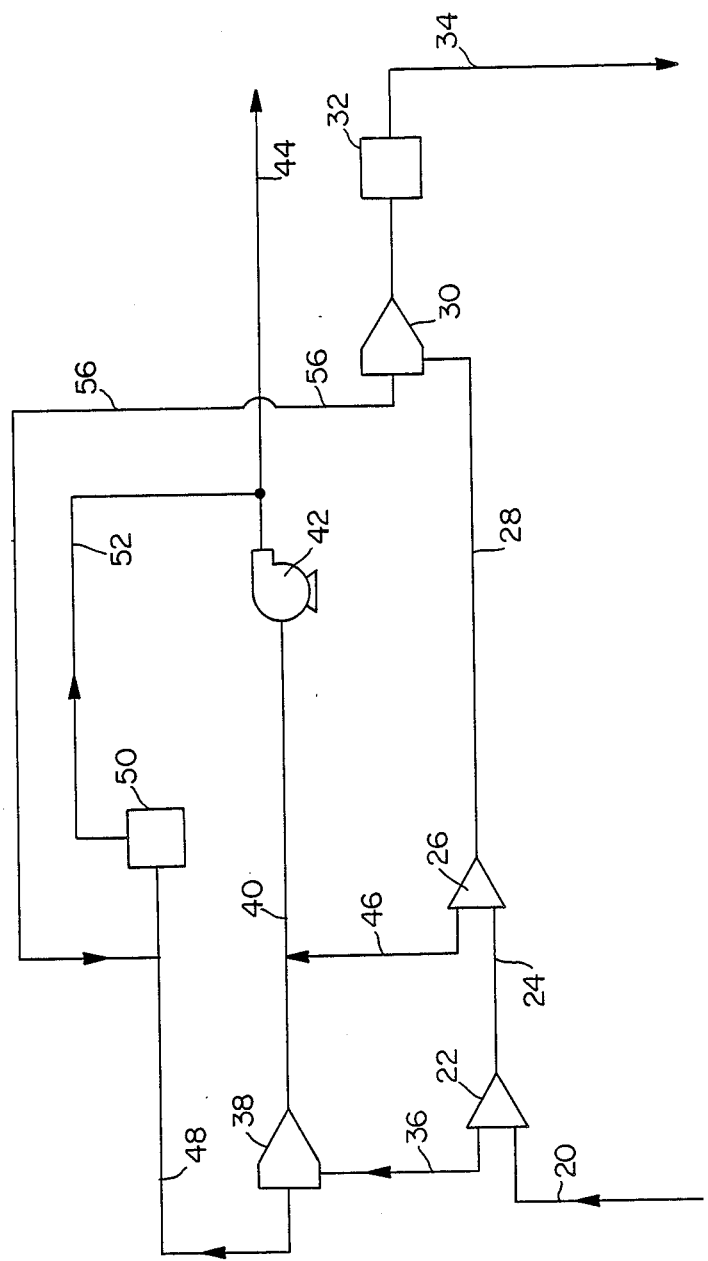

United States Patent [19]
Carroll et al.

[11] Patent Number: 4,738,779
[45] Date of Patent: Apr. 19, 1988

[54] CYCLONE SEPARATOR

[76] Inventors: Noel Carroll, Sherbrooke Road, Sherbrooke, Victoria; Gavan J. J. Prendergast, 3 Seaton Court, Mount Waverley, Victoria 3149, both of Australia

[21] Appl. No.: 905,337
[22] PCT Filed: Nov. 28, 1985
[86] PCT No.: PCT/AU85/00293
 § 371 Date: Sep. 23, 1986
 § 102(e) Date: Sep. 23, 1986
[87] PCT Pub. No.: WO86/03143
 PCT Pub. Date: Jun. 5, 1986

[30] Foreign Application Priority Data
Nov. 28, 1984 [AU] Australia .............................. PG8335
Jan. 25, 1985 [AU] Australia .............................. PG9041

[51] Int. Cl.$^4$ ............................................ B01D 17/038
[52] U.S. Cl. ................................. 210/512.2; 209/211; 209/144
[58] Field of Search ..................... 210/512.2; 209/211, 209/144; 166/267, 75.1

[56] References Cited
U.S. PATENT DOCUMENTS
3,759,324 9/1973 Mecusker ........................... 166/75.1
4,144,087 3/1979 Chwalek et al. .................... 209/211
4,323,122 4/1982 Knopik ............................... 166/267

Primary Examiner—Frank Sever
Attorney, Agent, or Firm—Ladas & Parry

[57] ABSTRACT

Oil processing apparatus for the treatment of a mixture containing oil and other constituents. The apparatus comprises two types of separators arranged to co-operate together, the first separator (22) being of the type capable of handling a mixture containing a relatively high percentage of oil and the second separator (26) being of the type capable of handling mixtures containing a relatively low percentage of oil so that substantially full separation of the oil and other components can be achieved. There is also provided a system for recovering oil from a subterranean reservoir wherein apparatus which may be of the type described above is at least partially located underground.

14 Claims, 3 Drawing Sheets

CYCLONE SEPARATOR

This invention relates generally to apparatus for the treatment or processing of mixtures containing oil such as crude oil and the like.

The use of cyclone separators for the separation of oil/water mixtures has increased over the last few years. One of the reasons for an interest in this area is because of the particular problems associated with off-shore platforms. One of the major problems is the weight of processing equipment and the space it takes up on platforms. This problem vastly increases the cost of construction of an off-shore platform. As a result of this, attempts are continuously being made to try and reduce the size and weight of processing equipment. It is with this in mind that investigations have been conducted into the use of cyclone separators.

Applicant has already devised separators of a unique type which can be used in the separation of oil/water mixtures where there is a relatively small amount of oil in the mixture (say less than 5%). For example, separators of the kind described in U.S. Pat. specification No. 4,237,006 or International patent application No. PCT/AU83/00028 have been successfully used in cleaning the residue water which remains after the substantial part of the oil is removed from the crude oil mixture. The separation of the major part of the oil from the crude oil mixture has been generally carried out using separating tanks and the like.

It is an object of the present invention to provide improved apparatus and systems incorporating such apparatus which provide for more advantageous separation of the oil from a mixture than prior art techniques.

According to one aspect of the present invention there is provided oil processing apparatus for the treatment of a mixture containing oil and other constituents, the apparatus comprising a primary treatment section which includes one or more primary cyclone separators each having inlet means and first and second outlet means, said primary cyclone separators(s) being of the type capable of handling a mixture containing a relatively high percentage of oil and of separating the mixture into first and second components which are discharged from said first and second outlet means respectively with said first component being relatively highly concentrated in oil and said second component being of relatively low concentration, the apparatus further including a secondary treatment section which includes one or more secondary cyclone separators the or each separator including inlet means operatively connected to said second outlet means of said primary cyclone separator(s), said secondary cyclone separator(s) further including first and second outlet means and being of the type capable of handling mixtures containing a relatively low percentage of oil and of separating the mixture received from said second outlet means of said primary cyclone separator(s) into first and second components which are discharged from said first and second outlet means of said secondary cyclone separator(s) respectively, said first component containing substantially the remainder of the oil and said second component being substantially oil free.

Preferably, the first outlet means of the primary cyclone separator(s) is operatively connected to means for removing gas from the first component.

It is further preferable that the first outlet means of the secondary cyclone separator(s) is operatively connected to means for removing gas from the first component. Preferably, the first outlet means of the primary and secondary cyclone separators are operatively connected to a common discharge line. Further, the separated gas may be compressed and returned to the oil discharge line.

According to another aspect of the invention an oil recovery system for recovering oil from an underground reservoir from which a mixture containing oil and other constituents can be discharged, the system comprising a line disposed in a cavity between the reservoir and the ground surface and oil processing apparatus for at least partially separating the oil from the other components in the mixture said apparatus being operatively connected with said line and at least part of said apparatus being disposed below the ground surface within said cavity. Preferably, the apparatus is of the type described earlier.

Preferably, at least the secondary treatment section of the oil processing apparatus is disposed below the surface. Further, there may be provided means for discharging the second component from said secondary cyclone separator(s) to a subterranean cavity.

Figure 2:
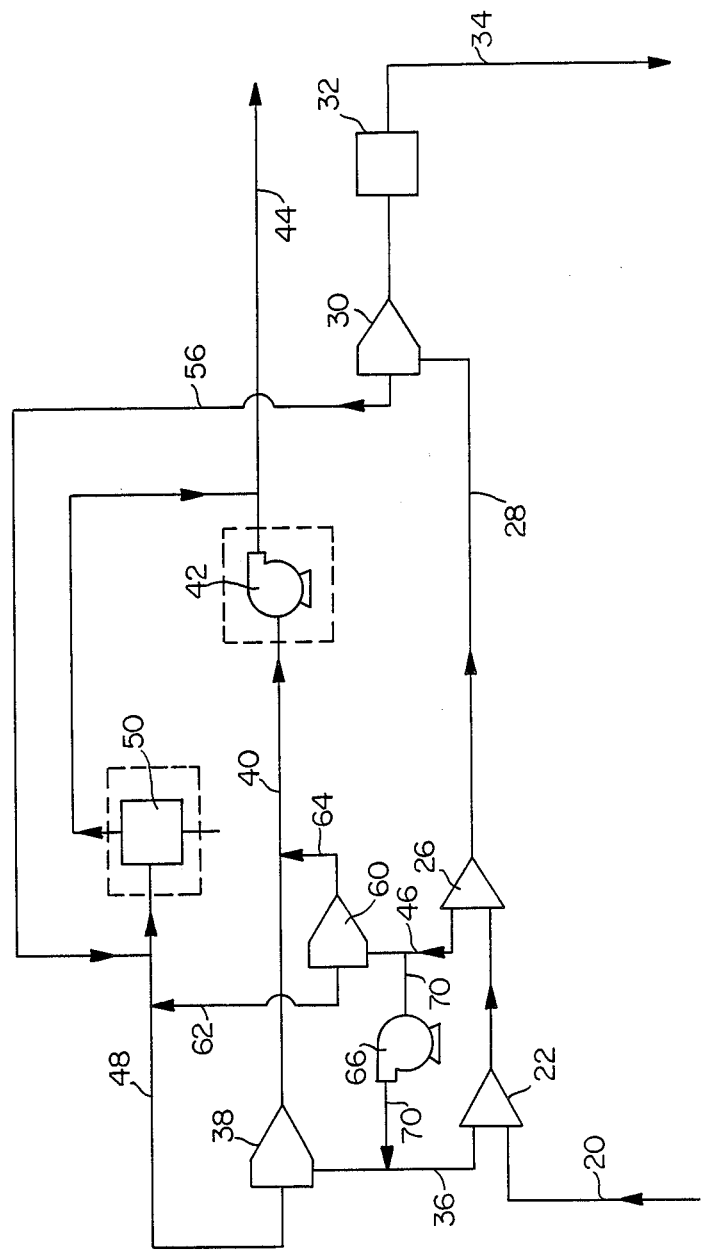
Figure 3:
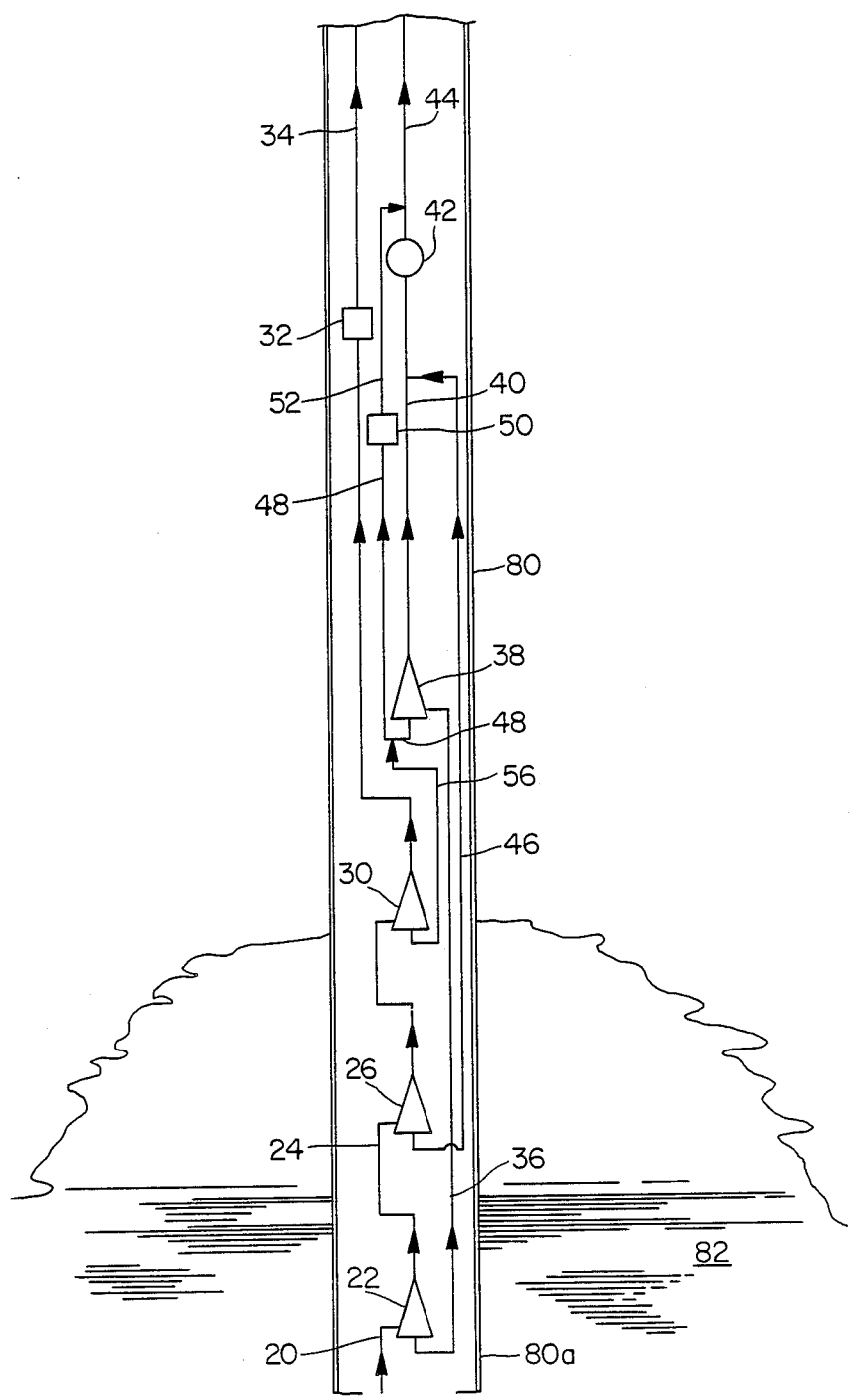

Preferred embodiments of the invention will hereinafter be described by way of example only with reference to the accompanying drawings in which:

FIGS. 1 to 2 show various forms of processing apparatus constructed in accordance with the invention; and FIG. 3 shows a system for recovering oil in accordance with the invention.

In FIG. 1, oil in a line 20 from the well head is passed to a cyclone separator of the type capable of handling high concentration of oil with the water dispersed in the oil, designated by reference numeral 22 this separator defining the primary treatment section. A line 24 therefrom at the underflow outlet end carries oily water and gas to the inlet of a second hydrocyclone 26, of the type capable of handling relatively low concentrations of oil with the oil dispersed in the water this separator defining the secondary treatment section. The underflow outlet of this separator 26 is passed on a line 28 to a cyclone water degasser 30 thence through an oil content monitoring device 32 to a clean water outlet 34. Oil and gas taken from the overflow outlet of the separator 22 passes on a line 36 to the inlet of a cyclone oil degasser 38. Oil from the underflow outlet of degasser 38 is taken on a line 40 through a pump 42 to an oil outlet line 44. Oil from separator 26 may be taken on a line 46 from the overflow outlet of separator 26 and added to line 40. The overflow outlet of degasser 38 is connected to a line 48 which carries gas from the degasser 48 through a gas compressor 50 to pass the gas via a line 52 to the line 44 so that gas is also carried on the line 44. The gas from the overflow outlet from the degasser 30 is taken on a line 56 and added to line 48.

The cyclone separator 26 may be of the type described in U.S. Pat. No. 4,237,006 or International application No. PCT/AU84/00028 and the separator 22 may be of the type described in applicant's co-pending Australian patent application No. P.H. 02991/85. The contents of all these documents are hereby incorporated in the present specifiction and form part of the disclosure.

The arrangement shown in FIG. 2 is similar to that shown in FIG. 1 and like reference numerals designate like components. The following description is confined only to differences as between the two figures. In this instance, instead of line 48 communicating directly with line 40, the overflow outlet of the separator 26 is passed to a cyclone separator 60, the overflow outlet of which carries gas, on a line 62, for admixture with gas in line 48. Oil from the underflow outlet of separator 60 is carried on a line 64 and is connected to line 40 for admixture of such oil into the oil carried by line 40. A pump 66 is provided in a line 70. Line 70 connects to line 36 and the line 46 from the overflow outlet of separator 26 to separator 60. Pump 66 pumps oil and gas from line 46 to return it to line 36.

In the arrangements of FIGS. 1 and 2, the cyclone oil degasser 38 may be omitted as may be the cyclone water degasser 30. The oil pump 42 and gas compressor 50 may likewise be unnecessary in some instances. In FIG. 2, either the pump 66 or the separator 60 may be omitted. It will be appreciated that while the primary and secondary treatment sections described have only a single cyclone separator each further separators could be provided in banks either in parallel or series.

Referring to FIG. 3, there is shown a system for recovering oil from a subterranean well which uses apparatus of the type described above which is disposed within a downhole cavity 80 which is the cavity which connects the oil reservoir 82 to the well head above ground (not shown).

Oil is admitted into the cavity 80 at its lower end 80a and thence passed to a line 20 which leads to the inlet of a cyclone separator of one type capable of handling high concentrations of oil with the water dispersed in the oil, designated by reference numeral 22. A line 24 therefrom at the underflow outlet end carries oily water and gas to the inlet of a second cyclone separator 26, capable of handling mixtures containing low concentrations of oil with the oil dispersed in the water. The underflow outlet of this separator 26 is passed on a line 28 to a cyclone water degasser 30 thence through an oil content monitoring device 32 to a clean water outlet 34. Oil and gas taken from the overflow outlet of the separator 22 passes on a line 36 to the inlet of a cyclone oil degasser 38. Oil from the underflow outlet of degasser 38 is taken on a line 40 through a pump 52 to an oil outlet line 44. Oil from separator 26 may be taken on a line 46 from the overflow outlet of separator 26 and added to line 40. The overflow outlet of degasser 38 is connected to a line 48 which carries gas from the degasser 48 through a gas compressor 50 to pass the gas via a line 52 to the line 44 so that gas is also carried on the line 44. The gas from the overflow outlet from the degasser 30 is taken on a line 56 and added to line 48.

By the above arrangement, oil can be taken on the line 44 to the surface of the well for further processing. The water in line 34 may likewise be taken to the surface or, alternatively, could simply be returned to the oil reservoir or to another reservoir which has been exhausted or partly exhausted at a higher level than the reservoir 82. This may be effected by outflow from a suitable exhaust arrangement in the pipeline.

In the case where there are multiple sources of mixture to be separated, conventional separation techniques commonly use, for economy, a single separating vessel. This does not allow for optimisation of separation or optimisation of the production of individual sources. By the present invention however it is economically feasible to provide individual separators or banks of separators for each source, corresponding separated components from each separator or bank of separators being, for example, combined after separation. By this means, separation of mixture from each source can be optimised and performance of each of the individual sources can also be optimised.

Also, the separating technique of this invention has the advantage that the cyclone separators which are used do not induce substantial shear in the mixtures being separated so that there is no great emulsification of the mixtures, which emulsification hampers separation. On the other hand, conventional techniques employing separating vessels usually require the insertion of pressure-reducing chokes into the mixture flow lines from the sources. These induce substantial shear in the mixture and cause emulsification which adversely affects separation.

Furthermore, in the embodiment where a cyclone separator is employed below the surface, the admitted mixture for separation will generally be at relatively high temperature and pressures, thereby greatly assisting separation.

What is claimed is:

1. Oil processing apparatus for the treatment of a mixture containing oil and other constituents, the apparatus comprising means for enabling the minimizing of the weight of said apparatus and the floor space required thereby, the apparatus including a primary treatment section which includes one or more primary cyclone separators (22) each having inlet means and first and second outlet means, said primary cyclone separator(s) being of the type capable of handling a mixture containing a relatively high percentage of oil and of separating the mixture into first and second components which are discharged from said first and second outlet means respectively with said first component being relatively highly concentrated in oil and said second component being of relatively low concentration, the apparatus further including a secondary treatment section which includes one or more secondary cyclone separators (26) the or each separator including inlet means operatively connected to said second outlet means of said primary cyclone separator(s), said secondary cyclone separator(s) further including first and second outlet means and being of a type capable of handling mixtures containing a relatively low percentage of oil and of separating the mixture received from said second outlet means of said primary cyclone separator(s) into first and second components which are discharged from said first and second outlet means of said secondary cyclone separator(s) respectively, said first component containing substantially the remainder of the oil and said second component being substantially oil free.

2. Oil processing apparatus according to claim 1 wherein said first outlet means of said primary cyclone separator(s) is operatively connected to means (38) for removing gas from the first component.

3. Oil processing apparatus according to claim 1 wherein said first outlet means of said secondary cyclone separator(s) is operatively connected to means (60) for removing gas from the first component.

4. Oil processing apparatus according to claim 1 or 2 wherein said first outlet means of said primary and secondary cyclone separators are operatively connected to a common discharge line (40).

5. Oil processing apparatus according to claim 1 wherein separated gas is compressed for further processing.

6. Oil processing apparatus according to claim 1 wherein said second outlet means of said primary cyclone separator(s) are operatively connected to a vessel between said primary cyclone separators and said secondary cyclone separators for removal of a component such as gas.

7. Oil processing apparatus according to claim 1 wherein said first outlet means of said primary cyclone separator(s) is operatively connected to means (38) for removing gas from the first component, and wherein said first outlet means of said secondary cyclone separator(s) is operatively connected to means (60) for removing gas from the first component.

8. Oil processing apparatus according to claim 7 wherein said first outlet means of said primary and secondary cyclone separators are operatively connected to a common discharge line (40).

9. Oil processing apparatus according to claim 8 wherein separated gas is compressed for further processing.

10. Oil processing apparatus according to claim 9 wherein said second outlet means of said primary cyclone separator(s) are operatively connected to a vessel between said primary cyclone separators and said secondary cyclone separators for removal of a component such as gas.

11. Oil recovery system for recovering oil from an underground reservoir (82) from which a mixture containing oil and other constituents can be discharged, the system comprising a line disposed in a cavity (80) between the reservoir and the ground surface and oil processing apparatus including means for enabling the minimizing of the weight of said apparatus and the floor space required thereby, the apparatus at least partially separating the oil from the other components in the mixture, said apparatus being operatively connected to said line and at least part of said apparatus being disposed below the ground surface within said cavity, said apparatus comprising: a primary treatment section which includes one or more primary cyclone separators (22) each having inlet means and first and second outlet means, said primary cyclone separator(s) being of the type capable of handling a mixture containing a relatively high percentage of oil and of separating the mixture into first and second components which are discharged from said first and second outlet means respectively with said first component being relatively highly concentrated in oil and said second component being of relatively low concentration, the apparatus further including a secondary treatment section which includes one or more secondary cyclone separators (26) the or each separator including inlet means operatively connected to said second outlet means of said primary cyclone separator(s), said secondary cyclone separator(s) further including first and second outlet means and being of the type capable of handling mixtures containing a relatively low percentage of oil and of separating the mixture received from said second outlet means of said primary cyclone separator(s) into first and second components which are discharged from said first and second outlet means of said secondary cyclone separator(s) respectively, said first component containing substantially the remainder of the oil and said second component being substantially oil free.

12. Oil recovery system according to claim 11 wherein said secondary treatment section of said oil processing apparatus is disposed below the surface.

13. Oil recovery system according to claim 12 further including means for discharging the second component from said second cyclone separator(s) to a subterranean cavity.

14. Oil recovery system according to claim 11 wherein said oil processing apparatus includes one or more primary cyclone separators each having inlet means and first and second outlet means and being of the type capable of separating the mixture into first and second components one component being relatively highly concentrated in oil said primary cyclone separators being disposed below the surface.

* * * * *